(12) United States Patent
Roessler et al.

(10) Patent No.: US 7,616,226 B2
(45) Date of Patent: Nov. 10, 2009

(54) VIDEO CONFERENCE SYSTEM AND A METHOD FOR PROVIDING AN INDIVIDUAL PERSPECTIVE VIEW FOR A PARTICIPANT OF A VIDEO CONFERENCE BETWEEN MULTIPLE PARTICIPANTS

(75) Inventors: Horst Roessler, Filderstadt (DE); Peter Szabo, Pforzheim (DE); Michael Walter Hoche, Schwieberdingen (DE)

(73) Assignee: Alcatel, Paris (FR)

( * ) Notice: Subject to any disclaimer, the term of this patent is extended or adjusted under 35 U.S.C. 154(b) by 650 days.

(21) Appl. No.: 11/098,562

(22) Filed: Apr. 5, 2005

(65) Prior Publication Data
US 2005/0237376 A1    Oct. 27, 2005

(30) Foreign Application Priority Data
Apr. 22, 2004    (EP)    .................................. 04291071

(51) Int. Cl.
*H04N 7/14*    (2006.01)
*G06F 15/16*    (2006.01)

(52) U.S. Cl. ............... 348/14.04; 348/14.01; 348/14.08

(58) Field of Classification Search ... 348/14.01–14.09, 348/14.1, 14.11–14.16; 709/204, 205
See application file for complete search history.

(56) References Cited
U.S. PATENT DOCUMENTS

| 5,850,352 | A | 12/1998 | Moezzi et al. |
|---|---|---|---|
| 5,872,923 | A | 2/1999 | Schwartz |
| 6,330,022 | B1 | 12/2001 | Seligmann |
| 6,583,808 | B2 | 6/2003 | Boulanger et al. |
| 2002/0023133 | A1 | 2/2002 | Kato et al. |
| 2003/0210326 | A1 | 11/2003 | Laveau et al. |
| 2004/0254982 | A1* | 12/2004 | Hoffman et al. ............ 709/204 |

FOREIGN PATENT DOCUMENTS

| EP | 0 999 518 A1 | 5/2000 |
|---|---|---|
| WO | WO 03/043327 A1 | 5/2003 |

* cited by examiner

*Primary Examiner*—Melur Ramakrishnaiah
(74) *Attorney, Agent, or Firm*—Sughrue Mion, PLLC (57) ABSTRACT

The present invention relates to a video conference system (SC, SE, VI) comprising at least one visual scan means (SC), a mediating Server entity (SE) and a at least one visual presentation means (VI) for presenting a scanned perspective view connected via a network, where the visual scan means (SC) comprises change means for changing the perspective view, and the video conference system (SC, SE, VI) comprises further mediating means (SE), storage means (MO), and control means that are adapted to process individual visual perspectives for the at least one visual presentation means, where the mediating means are adapted to aggregate multiple scanned views, where the storage means buffer the aggregate multiple scanned views, where the control means are adapted to instruct the change means for selecting a scan perspective, and where retrieval means are adapted to extract a requested individual perspective view out of the aggregated multiple scanned views. The invention further relates to a mediating media server, a client device, a computer software product, and a method for providing an individual perspective view for a participant of a videoconference between multiple participants.

12 Claims, 6 Drawing Sheets

VIDEO CONFERENCE SYSTEM AND A METHOD FOR PROVIDING AN INDIVIDUAL PERSPECTIVE VIEW FOR A PARTICIPANT OF A VIDEO CONFERENCE BETWEEN MULTIPLE PARTICIPANTS

TECHNICAL FIELD

The present invention relates to a videoconference system, a mediating media server, a client device, a computer software product, and a method for providing an individual perspective view for a participant of a videoconference between multiple participants.

The invention is based on a priority application, EP 04291071.1, which is hereby incorporated by reference.

BACKGROUND OF THE INVENTION

Video conferencing is the discussion between two or more people who are at different sites but can see and hear each other using telecommunications means. A telecommunication network carries pictures and sound such that conferences can take place across the world within a virtual space. For example, a point-to-point (two-person) video conferencing system works much like a video telephone. Each participant has a video camera, microphone, and speakers mounted on his or her communication device. As the two participants speak to one another, their voices are carried over the network and delivered to the other's speakers, and whatever images appear in front of the video camera appear in a window on the other participant's monitor.

Multi-point videoconferencing allows two, three, or more participants to sit in a virtual conference room and communicate as if they were sitting right next to each other. Videoconferencing will be one of the fastest-growing segments of the telecommunication industry.

The key to defining virtual reality in terms of human experience rather than technological hardware is the concept of presence. Presence can be thought of as the experience of one's physical environment; it refers not to one's surroundings as they exist in the physical world, but to the perception of those surroundings as mediated by both automatic and controlled mental processes. Presence is defined as the sense of being in an environment.

Many perceptual factors contribute to generating this sense, including input from some or all sensory channels, as well as more mindful attentional, perceptual, and other mental processes that assimilate incoming sensory data with current concerns and past experiences. Presence is closely related to the phenomenon of distal attribution or externalization, which refer to the referencing of our perceptions to an external space beyond the limits of the sensory organs themselves.

In unmediated perception, presence is taken for granted. However, when perception is mediated by a communication technology, one is forced to perceive two separate environments simultaneously: the physical environment in which one is actually present, and the environment presented via the medium. The term "telepresence" is used to describe the precedence of the latter experience in favor of the former; that is, telepresence is the extent to which one feels present in the mediated environment, rather than in the immediate physical environment.

Telepresence is defined as the experience of presence in an environment by means of a communication medium. In other words, "presence" refers to the natural perception of an environment, and "telepresence" refers to the mediated perception of an environment. This environment can be either a temporally or spatially distant "real" environment, for instance a distant space viewed through a video camera.

Improved video conferences will approximate telepresence, where (transparent) telepresence is understood as the experience of being fully present at a live real world location remote from one's own physical location. Someone experiencing transparent telepresence would therefore be able to behave, and receive stimuli, as though at the remote site. The resulting vicarious interactive participation in activities, and the carrying out of physical work, will bring benefits to a wide range of users.

U.S. Pat. No. 5,872,923 discloses a video conferencing system, wherein multiple parties at different locations can view, and modify, a common image on their computer displays. The invention also provides a video camera at each computer, which takes a video picture of each party. The invention distributes data to all computers involved in the conference from which each computer can generate a display containing the common image, the modifications, and the video pictures. At each site a facet of the environment is presented—a fractal partial communication space cramped mono-perspective impression.

The video conferencing apparatus disclosed in U.S. Pat. No. 6,330,022 supports a video conference including a processor/server, a conference bridge and a network of terminals, where each terminal equipped with at least a video camera, display and a user input device such as a mouse. A user may select a conference context including a conference location, type (setting) and purpose that may be different from the selection of another conferee. The user may select a conference location and type, view a conference according to a default selection or design their own location and type in advance of the conference. At the conference bridge, each conferee that joins a videoconference is assigned a position at a conference setting of their selected context, for example, a round table generated as a video graphic. At each terminal, a signal is either received or generated for display such that each conference participant is able to view all other participant conferees according to the assigned position arrangement within the context selected by the conferee. An audio signal can also be generated according to the assigned positions of the conferees that can be heard on 3D or stereo speakers in such a way as to relate to the assigned positions around the virtual conference setting.

SUMMARY OF THE INVENTION

Thus the invention provides the vision of a static shared communication space where the users stick to their manually controlled cramped mono-perspective impression.

Starting from U.S. Pat. No. 6,330,022 the problem is the provisioning of viewer-controllable individual perspectives of a common communication room. This enhances telepresence by the dimension of perspective convertibility of the environment.

This problem is solved by a video conference system comprising at least one visual scan means and a at least one visual presentation means for presenting a scanned perspective view connected via a network, the visual scan means comprising change means for changing the perspective view, where the video conference system comprising further mediating means, storage means, and control means that are adapted to process individual visual perspectives for the at least one visual presentation means, where the mediating means are adapted to aggregate multiple scanned views, where the storage means buffer aggregated multiple scanned views, where the control means are adapted to instruct the change means for selecting a scan perspective, and where retrieval means are adapted to extract a requested individual perspective view out of the aggregated multiple scanned views.

The problem is solved inter alia by a method for providing an individual perspective view for a participant of a video conference between multiple participants, where the method comprising the steps of visually scanning the multiple participants at different sites by visual scanning means, aggregating the scanned views into at least one communication space, adapting the visual scanning means, visually presenting at least one section of the at least one communication space to a participant, interpreting a request on changing a participant's perspective view and adapting the scanning, the aggregating, and the presenting such that the scanning means provide the necessary information for the at least one communication space to provide the participant's view perspective.

A corresponding computer software product would be a preferred realization for the method.

And the problem is solved by a mediating media server system in a network for mediating a telecommunication comprising interfaces to clients providing visual information and to clients consuming visual information, the mediating media server system comprising mediating means that are adapted to aggregate multiple visual information from the clients providing visual information into at least one communication space, storage means to buffer the at least one communication space, and control means that are adapted to process individual visual perspectives for the clients consuming visual information.

And the problem is solved inter alia by a client device comprising scan means and presentation means for providing and consuming visual information, and comprising change means for changing a perspective of the provided visual information and selection means for selecting a perspective of a consumed visual information.

In other words the target is to overcome the drawbacks of video conferencing compared to direct communication (physical presence) which is caused by the spatial restrictions, i.e. fixed perspectives, format, or resolution of the exchanged video information. Video communication is enhanced by the possibility of perspective exchange. Visual communication is heavily based on focusing (eye movements) i.e. the change of perspectives.

An extended and advanced ergonomic user interface for navigating through a video space (where the video conference takes place) in combination with a continuously scanned (three dimensional) video space is suggested. This video space is created by aggregating multiple two-dimensional perspectives on a mediating video server into a navigable multidimensional (spatial) video. The usual two-dimensional projections as supported by the usual video producers, e.g. a camera etc. are integrated into the multidimensional (spatial) video. And the presentation client allows navigating by user control, e.g. by an eye scan device or any other designation control, like a mouse or a joystick, through multiple (individual) perspectives.

Preferably the videoconference system comprises (multiple) scanning devices providing multiple perspectives of multiple areas at (about) the same time.

The scanned information is aggregated (glued together) at the mediating video server to a whole (holistic) video model. The mediating video server provides a hyper video resource, i.e. a video that could be viewed by multiple client where a presentation client can interact e.g. by navigating changing resolution, perspective etc. The interaction could be used to control the scan devices.

This technique enables a viewer to change concurrent to other viewers changing the perspective of the video presentation. Furthermore the video producers i.e. the scanning devices could range from e.g. Universal Mobile Telecommunication System (UMTS) mobile to cameras or even web cams.

The effect that the viewer has the impression that he could move through the communication room enables him to focus on details. This new telecommunication modality could be enhanced by the integration of designation metaphors for defining a user's perspective.

Accordingly, it is an object and advantage of the present invention to provide individual adaptable perspectives to a participant of a videoconference, which enhances the telepresence of participants drastically.

Another advantage of the present invention is that the invention provides a new communication metaphor, comparable with the asynchronous messaging (SMS), allowing users of this technology to explore new communication experiences and allowing providers to generate revenue based on the added value of the usage of the invention.

A further advantage of the present invention is that it provides a basis for further enhancements such as services for a constraint automatic perspective-change e.g. the focus to the loudest speaker, or focus due to distance checking or movement detection etc. or even the discussion of buffered past video conferencing material that is integrated in a video conference, i.e. changing the temporal perspective.

Furthermore the holistic technical presentation is a basis for further analytical (information) services like presence and position detection, scenic retrieval, or even metering.

BRIEF DESCRIPTION OF THE DRAWINGS

These and many other objects and advantages of the present invention will become apparent to those of ordinary skill in the art from a consideration of the drawings and ensuing description, where.

DETAILED DESCRIPTION OF THE INVENTION

Video processing within video conferencing is well known. International Patent Application No. WO 03/043327 provides a method to track and convey the presence of all participants in video conferencing. The system is configured to generate a video locator output and an audio locator output to determine the presence of all participants. Initially, the system focuses on a person who is speaking and conveys a close-up view of that person based on the video and audio locator outputs. Thereafter, if the person speaking continues to speak or becomes silent for a predetermined time period, the system operates to adjust the camera setting to display other participants in sequence who are not speaking or zooms out the camera by a specified amount to include all participants, so that the presence, including facial expressions and reactions, of all participants can be conveyed to the remote receiving end. The system is also configured to capture a new person entering or an existing participant exiting during the course of a videoconference session.

The effort to convey the presence of all participants leads to a mono-perspective impression by coupling additional modalities to control at least an interesting sector of the communication space but the introduced dynamics and lacks on personalization, i.e. a consuming participant is perceptively forced. The architecture of this system does not overcome this defect because of the limiting scanning devices, i.e. the motioned cameras.

Figure 1:
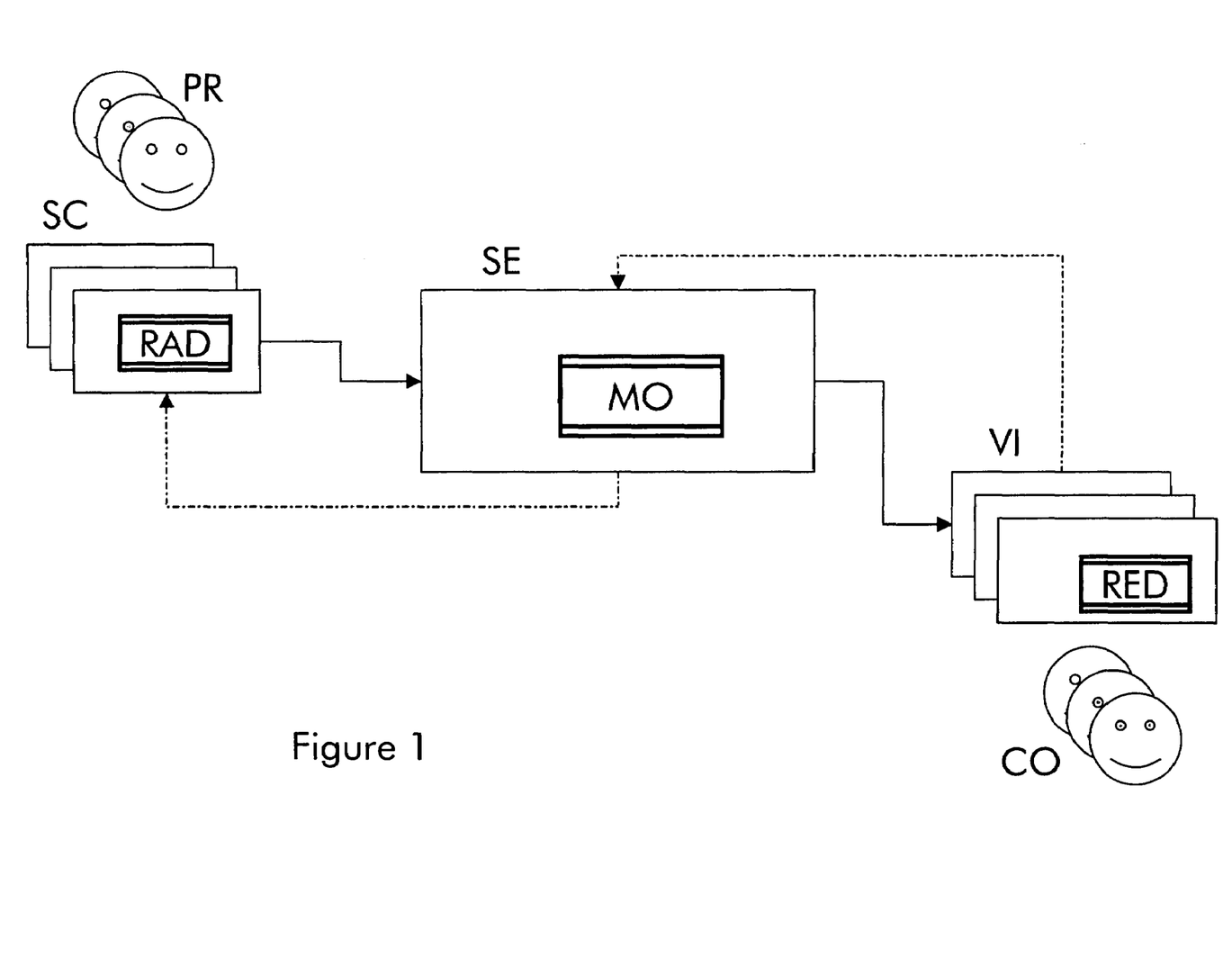
FIG. 1 is a schematic drawing of a videoconference system according to the invention.

FIG. 1 shows a plurality of scanning clients SC that are scanning producers PR, i.e. participants of a videoconference. The scanned information, i.e. the video and/or audio information are referenced as a raw producer data stream RAD. The figure also shows a mediating server entity maintaining a visual model MO of a videoconference, i.e. and aggregation of multiple scanned information RAD. And the figure shows a viewer clients VI each are presenting an individual visual perspective RED out of the visual model MO to consumers CO, that might be identical to the aforementioned producers PR. The data stream of the visual information is displayed by the draw through arrows between the scanning clients SC and the mediating server entity SE and mediating server entity SE and the viewer clients VI. The viewer clients VI can influence the rendering by requesting a change of the individual visual perspectives, which is indicated by the dashed arrow between then viewer client VI and the mediating server entity SE. The mediating sever entity SE can, based on such change requests, instruct or control the scanning clients SC to provide a suitable raw producer data stream RAD that the required individual perspective could be rendered out of the visual model MO.

The picture shows an architecture of the videoconference system, where the main entities are the scanning clients SC the mediating server entity SE, and the viewer clients VI. Although these entities are separately drawn the components might be integrated. A client device might integrate scanning clients SC and viewer clients VI. Even the mediating server entity might be distributed below multiple client devices. A preferred technical implementation is an additional mediating media server system hosting the mediation server entity SE. The communication modality could then be offered as a telecommunication service e.g. hosted at a provider.

Figure 2:
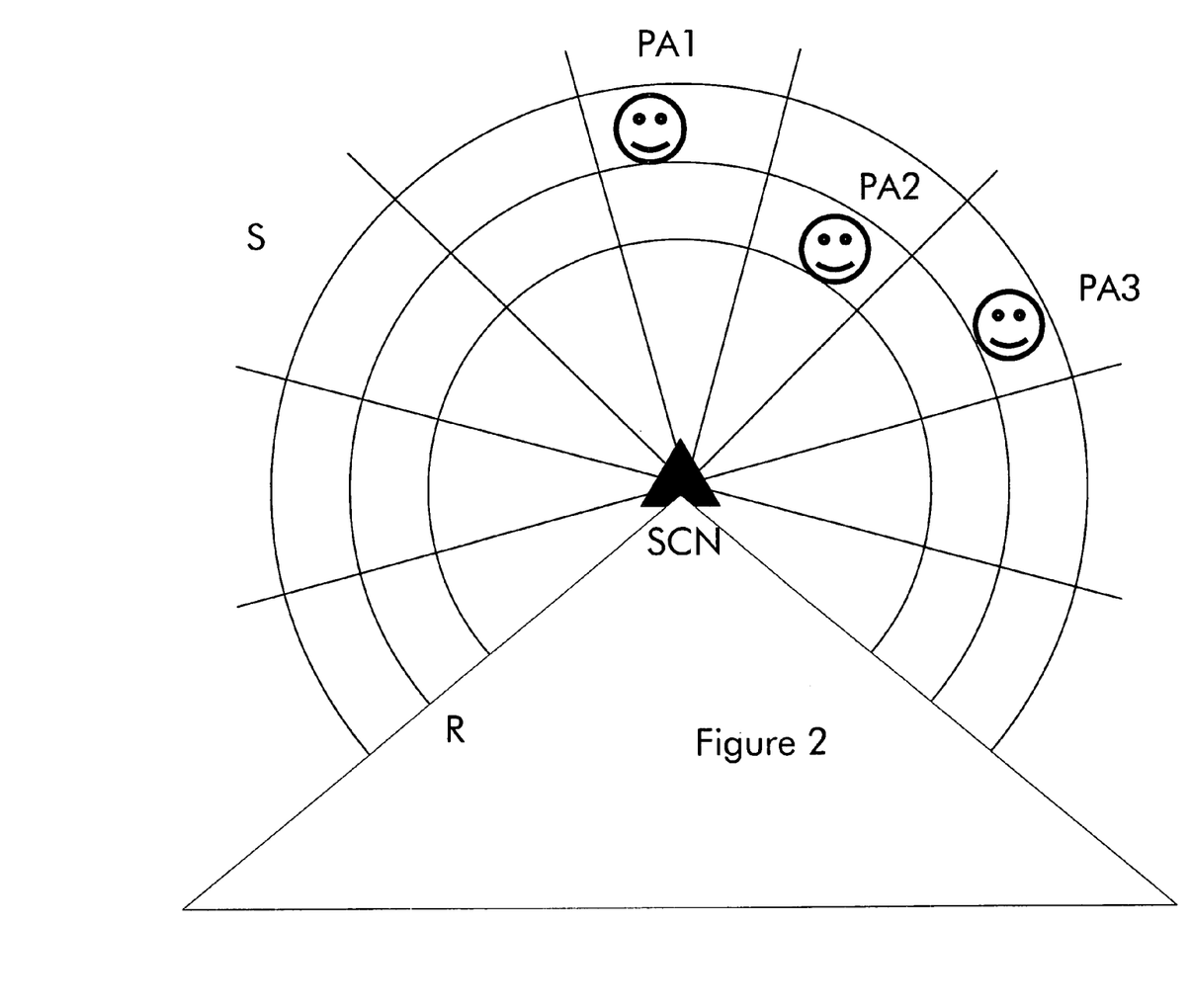
FIG. 2 is a schematic drawing of a client device according to the invention.

FIG. 2 shows a scan area of a scan device SCN that might be integrated into a client device according to the invention. The scan area is cut into segments using sectors S and radius R. Within the scan area there are three participants PA1, PA2 and PA3, each in a different segment.

The segments are continuously scanned, especially the one with the participants PA1, PA2, or PA3. The scan device could be controlled scanning only a part of the area, e.g. in the case of a camera the camera could be used to scan different cutouts with different magnification and different solutions in a time-sharing mode. Or the scan device might be a bunch of sensors, e.g. web cams covering the scan area. Where in the later case a true parallel mode of operation is possible.

Figure 3:
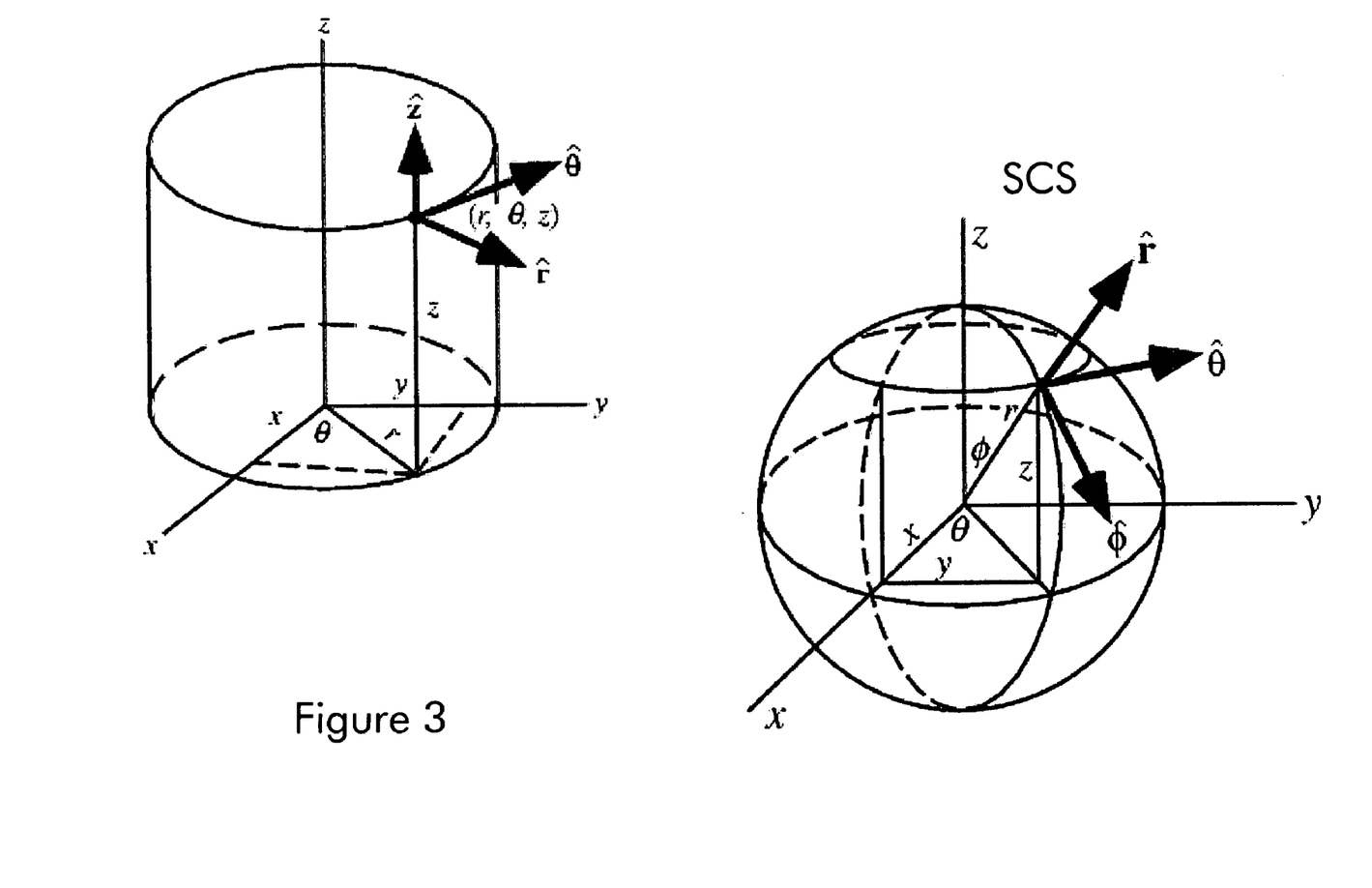
FIG. 3 is a schematic drawing of coordinate systems for aggregating perspectives that are applicable for a communication space within the method according to the invention.

FIG. 3 shows two uniform coordinate systems for presenting for aggregating perspectives, i.e. scanned information, a cylindrical coordinate system ZCS and a spherical coordinate systems SCS. Within a uniform coordinate system the projection of scanned information could be presented with respect to orientation and position of the scanned object as well as with respect to the position and orientation of the scanning device. The translation between local coordinates into the uniform coordinate system provides holistic and temporal (referential) integrity and consistence.

The two uniform coordinate system provide simple examples for scanning modes. E.g. the cylindrical coordinate system ZCS is applicable in the case of a scanning along a line z when varying the angle $\Theta$ and the radius r. This leads to a bunch of cylinders each providing a surround picture with a focus on a certain distance (radius r) that could be presented at a viewer.

There are currently a bunch of reconstruction algorithms available that are capable of deriving from multiple plane perspectives (plane views) full three dimensional information, e.g. by applying linear algebra techniques. The data collected might be dense but contains little information about the complexity and topology of the scanned object. In order to build a model, it is preferable to group adjacent point data into regions of like surface. This segmentation process involves labeling those parts of the image that lie on a common geometric entity yielding an models of scenes. Several reconstruction methods are known from computer vision, see e.g. Computer Vision-Based Gesture Tracking, Object Tracking, and 3D Reconstruction for Augmented Desks by Thad Starner et al. available at http://www.vision.ethz.ch/leibe/papers/starner-perceptive-mva02.pdf.

Figure 4:
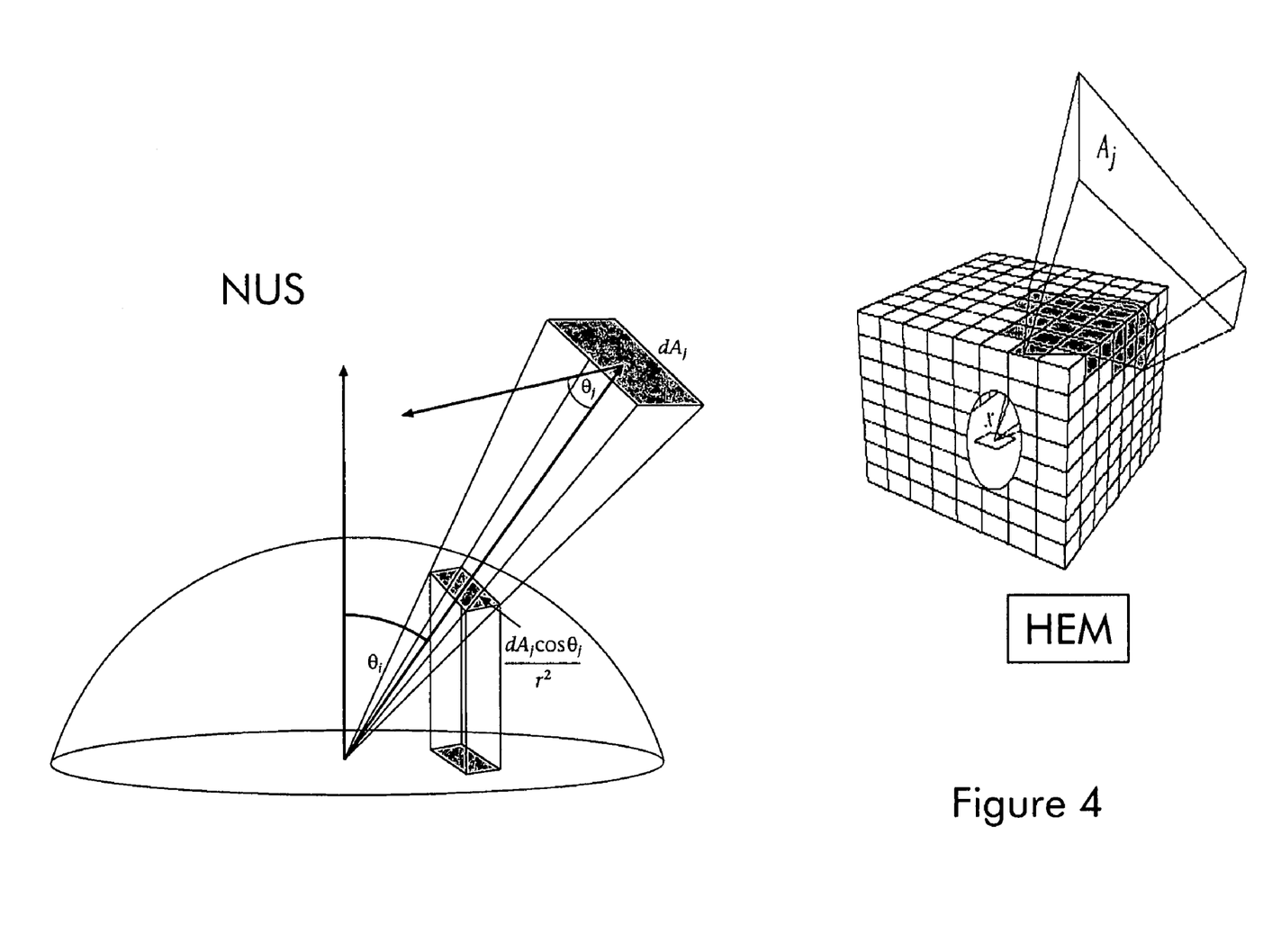
FIG. 4 is a schematic drawing of the communication space data structure within the method according to the invention.

The holistic integration of information is illustrated by FIG. 4. The figure contains an illustration of the "Nusselt analog" NUS and of the "hemicube" HEM of the radiosity algorithm.

The Nusselt analog NUS involves placing a hemispherical projection body, with unit radius, at a point on a surface. The second surface is spherically projected onto the projection body, and then cylindrically projected onto the base of the hemisphere. The form factor is, then, the area projected on the base of the hemisphere divided by the area of the base of the hemisphere.

The "hemicube" HEM form factor calculation method involves placing the center of a cube at a point on a surface, and using the upper half of the cube (the "hemicube" which is visible above the surface) as a projection body as defined by the "Nusselt analog."

Each surface of the hemicube is subdivided into a set of small, usually square ("discrete") areas, each of which has a form factor value.

These two structures are the basis for a holistic presentation of a three dimensional picture. The theory behind radiosity mapping is that one is able to approximate the radiosity of an entire object by pre-calculating the radiosity for a single point in space, and then applying it to every other point on the object. The reason that this works is because points in space that are close together all have approximately the same lighting.

For points that are far apart from each other one has to calculate a different radiosity solution for each of them.

An answer to how to calculate and store the radiosity of a single point in space might be a cube view. A cube view is actually a very simple concept. It is merely six renderings of the scene from a single point in space. One of those renderings is rendered with the view looking up. Another of the renderings is rendered from the view looking down. Another is left, another is right, another is forward, and another is backward. When all of the six renderings are put together, so that their edges line up, they form a cube. And that cube just happens to be a full 360-degree view of the entire scene from a single point in three-dimensional space. Also, each of the views must be rendered with a field of view of 90 degrees.

So, the way to store the holistic information of the single point in space, is to render a cube view from that point. The basic idea behind it is to treat every pixel of the cube view as if it were a light source, because the entire point of radiosity is that objects contribute light to other objects.

Figure 5:
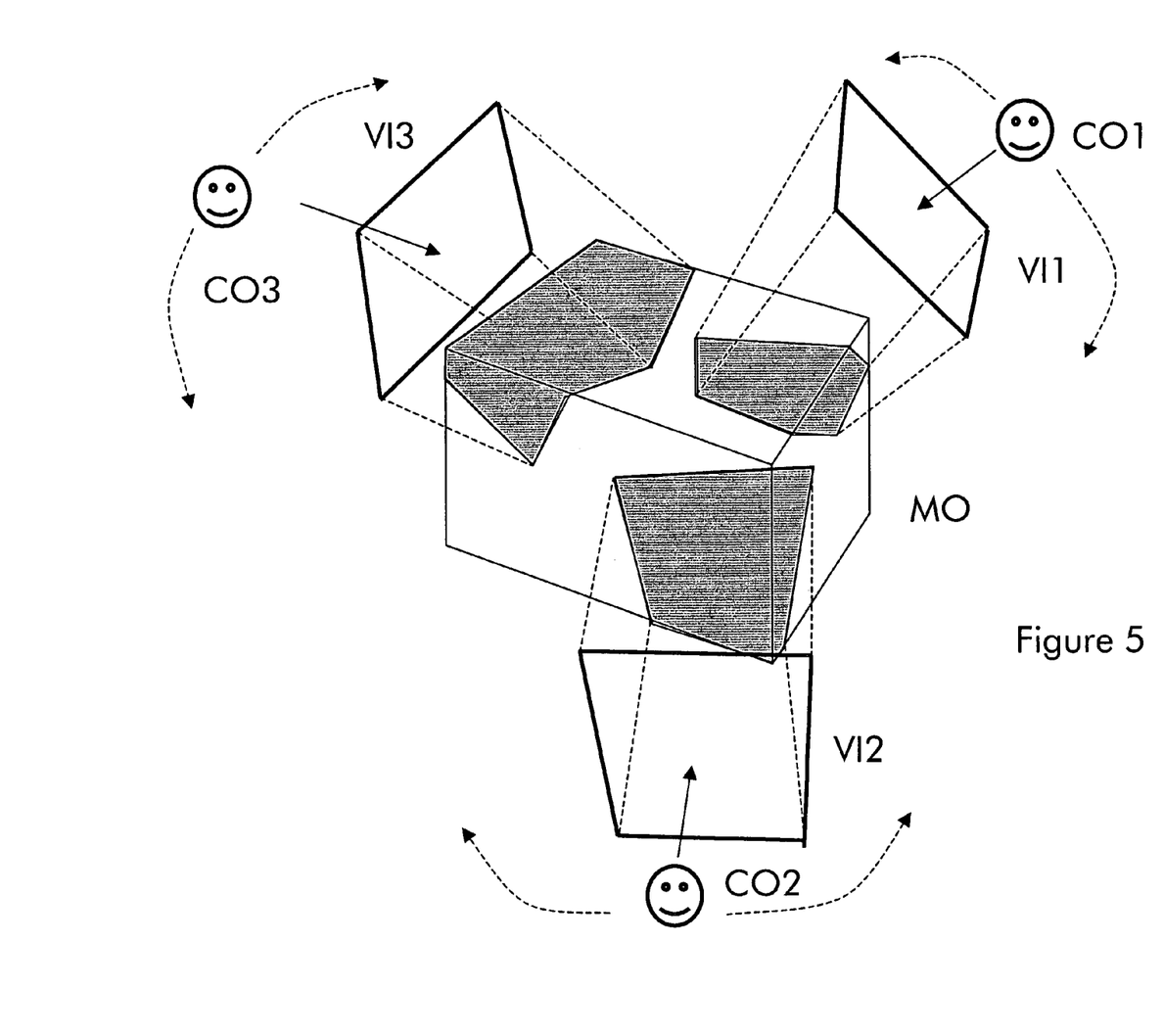
FIG. 5 illustrates the method according to the invention.

FIG. 5 shows three perspective views V11, V12, and V13 of their participants (consumers) CO1, CO2, and CO3. Each participant sees a rendered result from a common shared holistic model MO which is a projection on a view plane defining the perspective via the respective normal vector, which is indicated by the arrows.

The shaded areas indicate necessary scan information. The white area of the shared holistic model MO contains less important perspective information (although contributing). The selection of the perspective might influence the scanning mode and the scan coverage of the scanning device(s).

Figure 6:
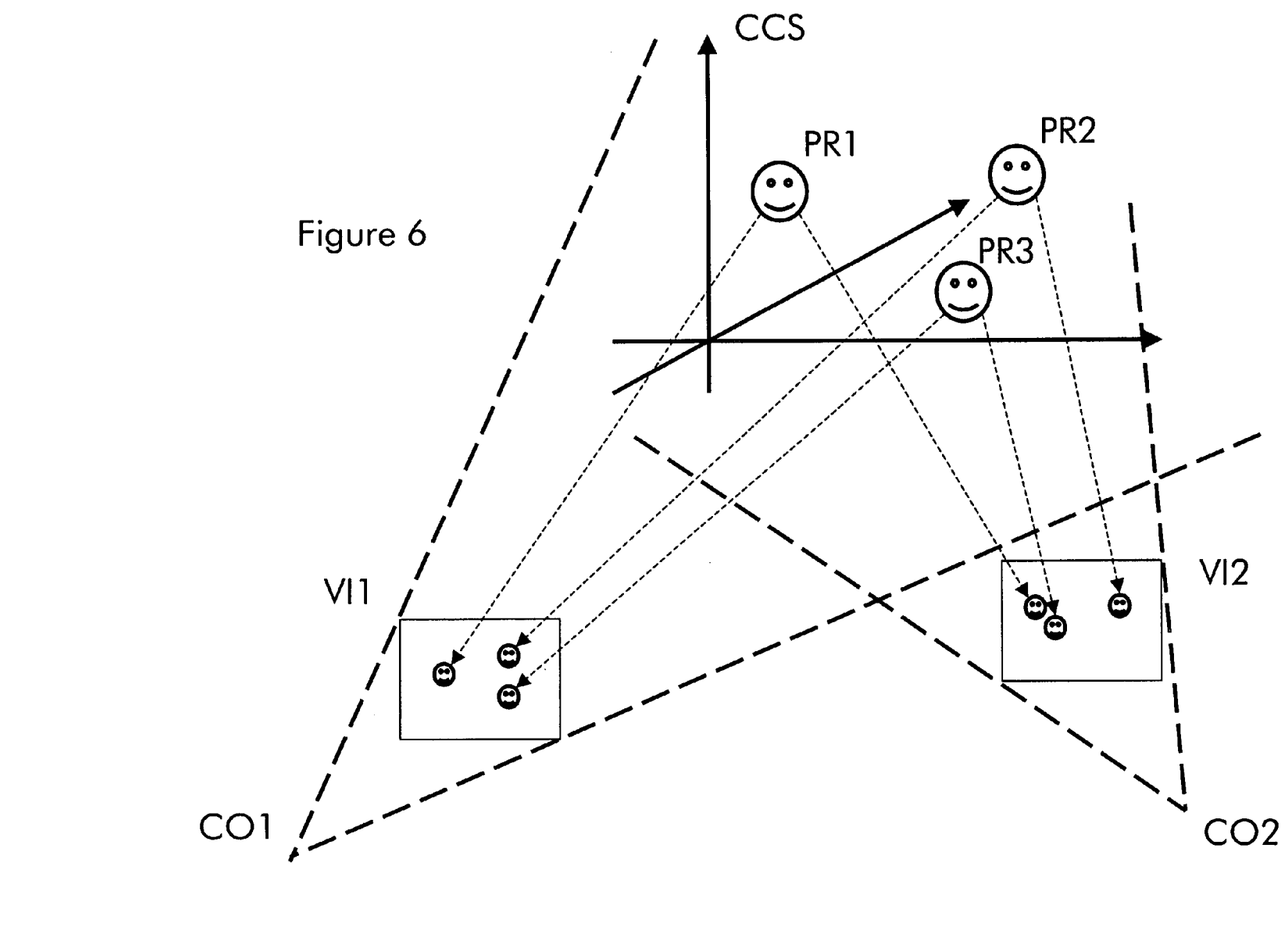
FIG. 6 illustrates the presentation of individual perspectives within the method according to the invention.

FIG. 6 illustrates the presentation of individual perspectives by a scenic view comprising participants PR1, PR2, and PR3 as audiovisual objects within a uniform three dimensional (Cartesian) coordinate system CCS, and two projection views V11 and V12 for two consumers CO1 and CO2.

The dashed cones illustrate the perspective and the rectangles the projection plane on which the selected views V11 and V12 are rendered. The audiovisual information (objects) as well as the projections are retrieved by a common source containing the holistic information.

The rendering of the projection might be done on server site as well as on client site, whatever distribution mechanism is chosen.

Video conferencing enhances communication only limited compared to direct communication (physical presence). This is due to the spatial restrictions like fixed perspective, format, or resolution of the exchanged video information.

Currently only cameras with remote control allow to change perspective or to zoom in or out.

The holistic model allows a video communication metaphor including a perspective exchange. Visual communication is heavily based on eye movements corresponding to perspective exchange which is the reason for a virtual reality effect.

An advanced ergonomic user interface navigating through a continuously scanned three dimensional video space is suggested.

The video space is created by aggregating multiple two-dimensional perspectives on the video server into a navigable three-dimensional video. The two-dimensional perspectives are originated by the video producer in a regular way. And the video client allows navigating by user control, e.g. by an eye scan device or simply a joystick.

There is an increasing demand on visual conferencing. Today's tools provide only mono-perspective communication metaphors. That means the viewer is very limited in choosing his or her perspective.

Partial scanned information is aggregated at a video server to a whole. The video server provides a hyper video resource, i.e. a video that could be viewed by multiple client where the client can interact e.g. by navigating changing resolution, perspective etc.

This technique enables a viewer to change concurrent to others the perspective.

The effect is that the viewer has the impression that he could move through the communication room, which enables him to focus on details. The transition is from a cramped mono-perspective impression to an unrestricted multi-perspective impression.

The invention will add truly a further new modality in telecommunication enhancing e.g. information retrieval from video sources e.g. by really looking behind the picture.

What is claimed is:

1. A video conference system comprising:
at least one visual scan module;
at least one visual presentation module; and
a mediating module, a storage module, a control module, and a retrieval module, configured to render an individual perspective view for the at least one visual presentation module,
wherein:
the at least one visual scan module and the at least one visual presentation module are connected via a network;
the at least one visual scan module comprises a change module that changes a perspective view scanned by the at least one visual scan module;
the mediating module is configured to aggregate multiple perspective views scanned by the at least one visual scan module;
the storage module buffers the aggregated multiple perspective views scanned by the at least one visual scan module;
the control module is configured to control the change module to change the perspective view scanned by the at least one visual scan module; and
the retrieval module is configured to extract the individual perspective view requested by a video conference participant and rendered using the aggregated multiple perspective views scanned by the at least one visual scan module.

2. The video conference system according to claim 1, wherein the request for the individual perspective view is derived from a participant's eye movements.

3. The video conference system according to claim 1, wherein the presentation module is configured to present a synchronized audio perspective to said individual perspective view, such that audio presentation is adapted to the individual perspective view.

4. The videoconference system according to claim 1, wherein the individual perspective view comprises a time-shifted perspective.

5. The video conference system according to claim 1, wherein the storage module comprises a retrieval module that is configured to provide stored video sequences for the individual perspective view in such a way that the conference participants have control over the video clip to adapt the scenes to the conversation.

6. A method for providing an individual perspective view for a participant of a video conference between multiple participants, the method comprising:
visually scanning the multiple participants at different sites by a visual scanning module,
aggregating views scanned by the visual scanning module into at least one visual model,
visually presenting at least one portion of the at least one visual model to a participant,
wherein said method further comprises:
interpreting a request to change an individual perspective view of a participant and adapting the scanning, the aggregating, and the presenting such that the scanning module provides the necessary information for the at least one visual model to provide the requested individual perspective view.

7. The method according to claim 6, wherein the request for the individual perspective view is derived from a participant's eye movements.

8. The method according to claim 6, wherein the individual perspective view comprises an audio perspective.

9. The method according to claim 6, wherein the individual perspective view comprises a time-shifted perspective.

10. A computer software product that is configured to perform the method according to claim 6.

11. A mediating media server system in a network, comprising interfaces to clients providing visual information and to clients receiving visual information, wherein said mediating media server system comprises a mediating module that is configured to aggregate multiple visual information from the clients providing visual information into at least one visual model, a storage module to buffer the at least one visual model, and a control module that is configured to render individual perspective views for the clients receiving visual information.

12. The mediating media server according to claim 11, wherein the control module is configured to instruct a client providing visual information to change the perspective view of the provided visual information, based on an individual perspective view requested by a client receiving visual information.

* * * * *

UNITED STATES PATENT AND TRADEMARK OFFICE
CERTIFICATE OF CORRECTION

PATENT NO. : 7,616,226 B2  
APPLICATION NO. : 11/098562  
DATED : November 10, 2009  
INVENTOR(S) : Roessler et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1162 days.

Signed and Sealed this

Nineteenth Day of October, 2010

David J. Kappos  
*Director of the United States Patent and Trademark Office*